United States Patent [19]
Tominaga

[11] Patent Number: 6,062,171
[45] Date of Patent: May 16, 2000

[54] EXCRETION HOUSING FOR SMALL PET ANIMALS AND HOUSING SYSTEM WITH SUCH EXCRETION HOUSING

[75] Inventor: Kazutoshi Tominaga, Osaka, Japan

[73] Assignee: Kabushiki Kaisha Tominaga Jyushi Kogyosho, Osaka, Japan

[21] Appl. No.: 09/145,026

[22] Filed: Sep. 1, 1998

[30] Foreign Application Priority Data

Sep. 1, 1997 [JP] Japan .................................... 9-235535

[51] Int. Cl.[7] .............................. A01K 1/02; A01K 31/06
[52] U.S. Cl. ......................................................... 119/455
[58] Field of Search ................................... 119/452, 455, 119/458, 479, 462, 459, 467, 456, 460, 477

[56] References Cited

U.S. PATENT DOCUMENTS

| | | | |
|---|---|---|---|
| D. 113,165 | 1/1939 | Hoefler | 119/455 |
| 3,381,663 | 5/1968 | Dayton | 119/455 |
| 3,742,908 | 7/1973 | Merino | 119/15 |
| 3,791,346 | 2/1974 | Willinger et al. | 119/17 |
| 3,865,082 | 2/1975 | Lovitz et al. | 119/17 |
| 3,958,534 | 5/1976 | Perkins et al. | 119/15 |
| 5,092,269 | 3/1992 | Phillips et al. | 119/15 |

*Primary Examiner*—Thomas Price
*Attorney, Agent, or Firm*—Armstrong, Westerman, Hattori, McLeland & Naughton

[57] ABSTRACT

An excretion housing for small pet animals such as hamsters includes an excretion housing body which is supposed to be directly or indirectly connected to a main housing for breeding small pet animals such that the excretion housing body is disposed outside the main housing. The excretion housing body has an entrance opening for small pet animals. A connecting portion is provided for directly or indirectly connecting the excretion housing body to the main housing. The connecting portion is formed on a periphery of the entrance opening. The excretion housing body includes at least two divided housing bodies detachably connecting each other to form a substantially closed space therein for small pet animals.

10 Claims, 12 Drawing Sheets

EXCRETION HOUSING FOR SMALL PET ANIMALS AND HOUSING SYSTEM WITH SUCH EXCRETION HOUSING

BACKGROUND OF THE INVENTION

1. Field of the Invention

The present invention relates to an excretion housing for small pet animals such as hamsters or the like, and to a housing system with such an excretion housing.

2. Description of the Related Art

Recently, hamsters, for example, have become popular small pet animals especially for city dwellers since such hamsters have a nice appearance and good behavior and are easy to keep even in a relatively small house such as an apartment house, a town house, or the like.

In a housing for keeping small pet animals such as hamsters, various kinds of accessories, such as a feeder, a rotary plaything, a passageway tube, an excretion container or the like, are commonly placed. Among these accessories, as a conventional excretion container, a tray-shaped container or a top-opened container covered with a transparent hood has generally been used.

The above-mentioned conventional excretion containers are placed in a main housing for keeping small pet animals. Therefore, when a user needs to change filler in the excretion housing or needs to dispose of excretion therein, he needs to remove or open an upper cover of the main housing or a door so that the excretion container can be taken out. However, this required work has been too troublesome. In addition, when the upper cover is removed or the door is opened to take out the excretion container, there is a possibility that the hamsters can escape through the opened portion.

In an top-opened, or tray-shaped excretion container, there are another problems in that hamsters can scatter the filler or the excretion in the excretion container to get the inside of the main housing dirty.

SUMMARY OF THE INVENTION

One object of the present invention is to provide an excretion housing and a housing system for small pet animals such as hamster that can effectively prevent environmental pollution around the housing, and that can enable an easy exchange of filler or an easy disposal of excretion, and also that can surely prevent hamsters from escaping during the exchange or disposal of filler or excretion.

In order to achieve the above mentioned and other objects, an excretion housing for small pet animals such as hamsters according to the present invention includes:

an excretion housing body to be directly or indirectly connected to a main housing for breeding small pet animals such that the excretion housing body is disposed outside the main housing, the excretion housing body having an entrance opening for small pet animals; and a connecting portion for directly or indirectly connecting the excretion housing body to the main housing, wherein the excretion housing body includes at least two divided housing bodies detachably connected each other to form a substantially closed space therein for small pet animals.

In the excretion housing according to the preferred embodiments of the present invention, since the excretion housing is disposed outside the main housing, exchanging filler or disposing of excretion can be done without taking out the excretion housing from the main housing. Further, in this case, since it is not required to detach an upper cover of the main housing or to open a door when exchanging filler or disposing of excretion, hamsters are prevented from escaping.

Since the excretion housing has a substantially closed structure, filler or excretion in the excretion housing can be prevented from being scattered outside even if the hamsters dig up or scatter them. Thus, environmental pollution around the excretion housing can be surely prevented.

The connecting portion may be formed on a periphery of the entrance opening,

According to the present invention, it is preferable that the excretion housing body is composed of an upper half housing body and a lower half housing body, and the upper half housing body is detachably connected to the lower half housing body. In this case, since the excretion housing body is made up of the lower housing body and the upper housing body, the excretion housing body can be easily opened by detaching the upper housing body from the lower housing body after the excretion housing body is detached from the main housing, resulting in an easier exchange of filer material and the like.

It is preferable that the excretion housing body is made of a hard synthetic resin. In this case, since the excretion housing body is made of a hard synthetic resin, it can be manufactured by a heat forming method, for example, with a high manufacturing efficiency and the material cost can be kept low, which results in a reduced manufacturing cost.

It is preferable that the excretion housing body has a plurality of ventilating slits. This enhances a ventilation in the excretion housing.

The connecting portion may be an outwardly protruded cylindrical portion integrally formed around the periphery of the entrance opening.

It is preferable that the outwardly protruded cylindrical portion is formed on the tower housing body. In this case, the upper housing body can be detached from the lower housing body with the lower housing body connected to the main housing. Thus, exchanging filler contained in the excretion housing or disposing of excretion can be easily conducted.

The excretion housing may further comprise a lip member for connecting the excretion housing body to the main housing or a passageway tube connected to the main housing, wherein the lip member has an entrance opening for small pet animals and is detachably connected to the connecting portion of the excretion housing body.

According to another aspect of the present invention, a housing system for small pet animals, comprises:

a main housing for breeding small pet animals therein, the main housing having a side wall with an opening; and an excretion housing, wherein the excretion housing includes:

an excretion housing body forming a substantially closed space for small pet animals therein, and the excretion housing body having an entrance opening for small pet animals; and a connecting portion for directly or indirectly connecting the excretion housing body to the main housing, wherein the excretion housing body is directly or indirectly connected to the main housing such that the excretion housing body is disposed outside the main housing.

Other objects and features will be apparent from the following detailed description of the invention with reference to the attached drawings.

BRIEF DESCRIPTION OF THE DRAWINGS

The present invention will be more fully described and better understood from the following description, taken with the appended drawings, in which.

DETAILED DESCRIPTION OF THE PREFERRED EMBODIMENTS

Preferred embodiments of the present invention will now be described, in detail, with reference to the accompanying drawings.

Figure 1:
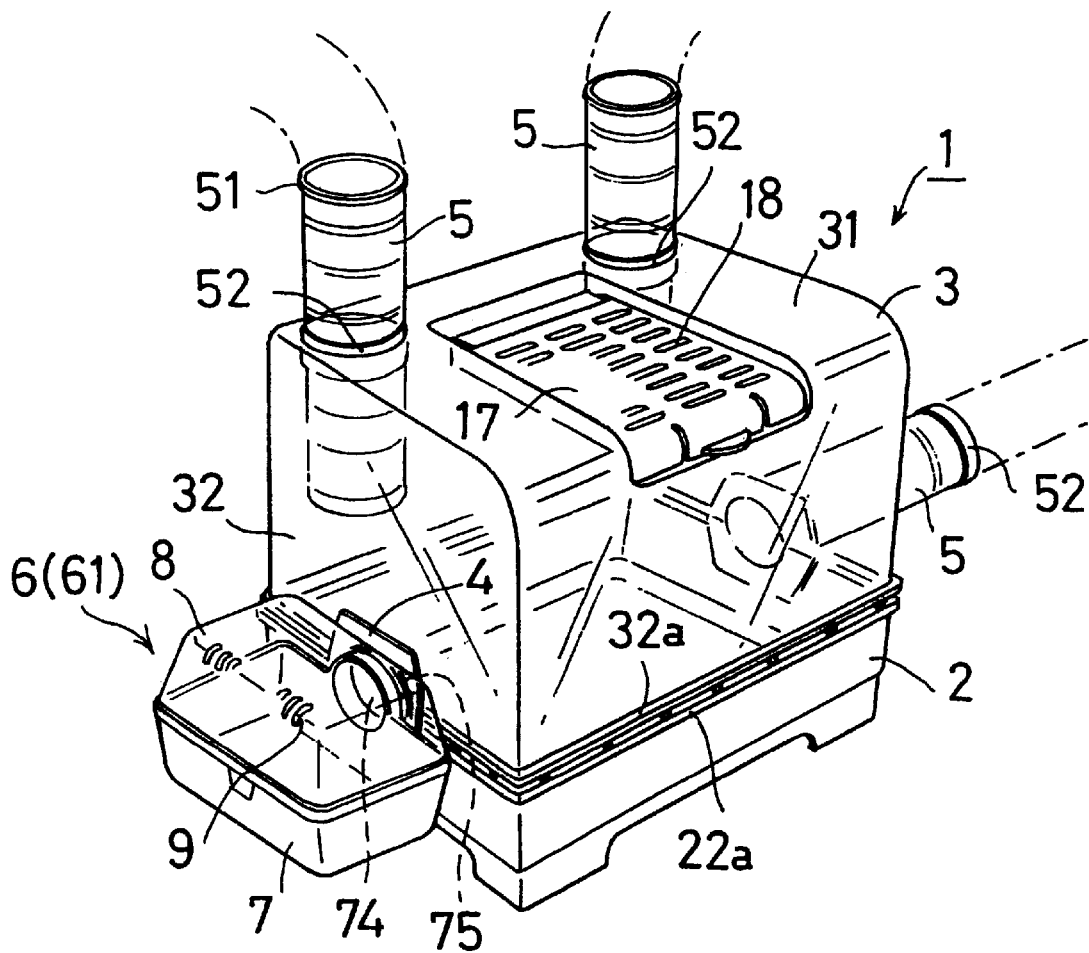
FIG. 1 is a perspective view showing a hamster housing system including an excretion housing according to an embodiment of the present invention.
Figure 2:
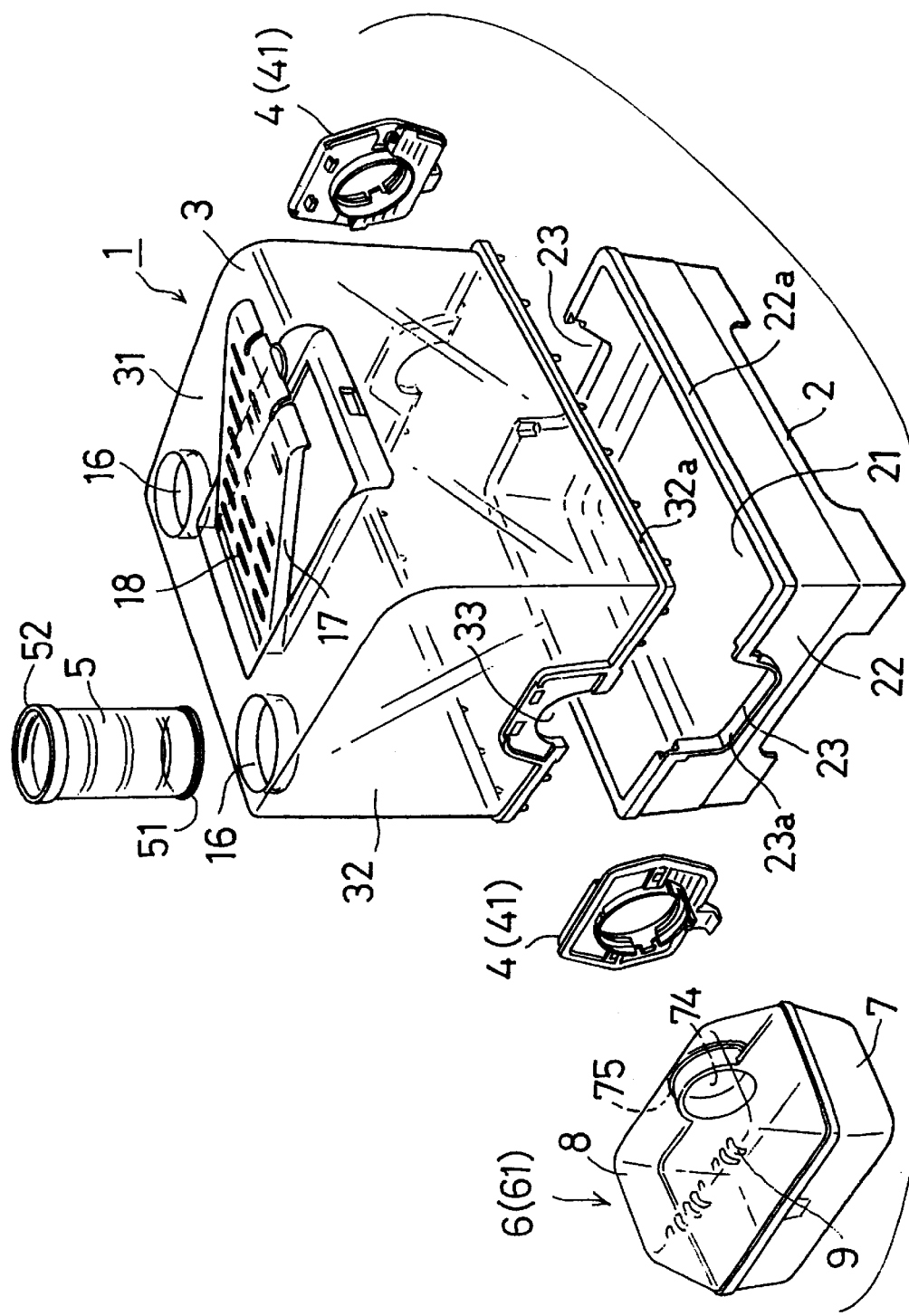
FIG. 2 is a perspective view showing the housing system in a disassembled state.

FIGS. 1 and 2 show an embodiment of a housing system with an excretion housing 6 for hamsters.

As shown in these figures, in the housing system, accessories such as an excretion housing 6, a passageway tube 5, or the like, can be connected to the breeding main housing 1, if desired, so that a desired breeding environment can be formed.

The breeding main housing 1 includes a base tray 2 and an upper cover 3. The upper cover 3 is connected to the base tray 2 by a lip member 4.

As shown in FIG. 2, the base tray 2 is a molded hard plastic article of a box shape with its upper end opened. The base tray 2 has a bottom wall 21 and side walls 22 extending upward from a periphery of the bottom wall 21 and formed integrally therewith. Among the side walls 22, a U-shaped cut-out portion 23 is provided at a central upper portion of tow opposing side walls 22, respectively.

Figure 4:
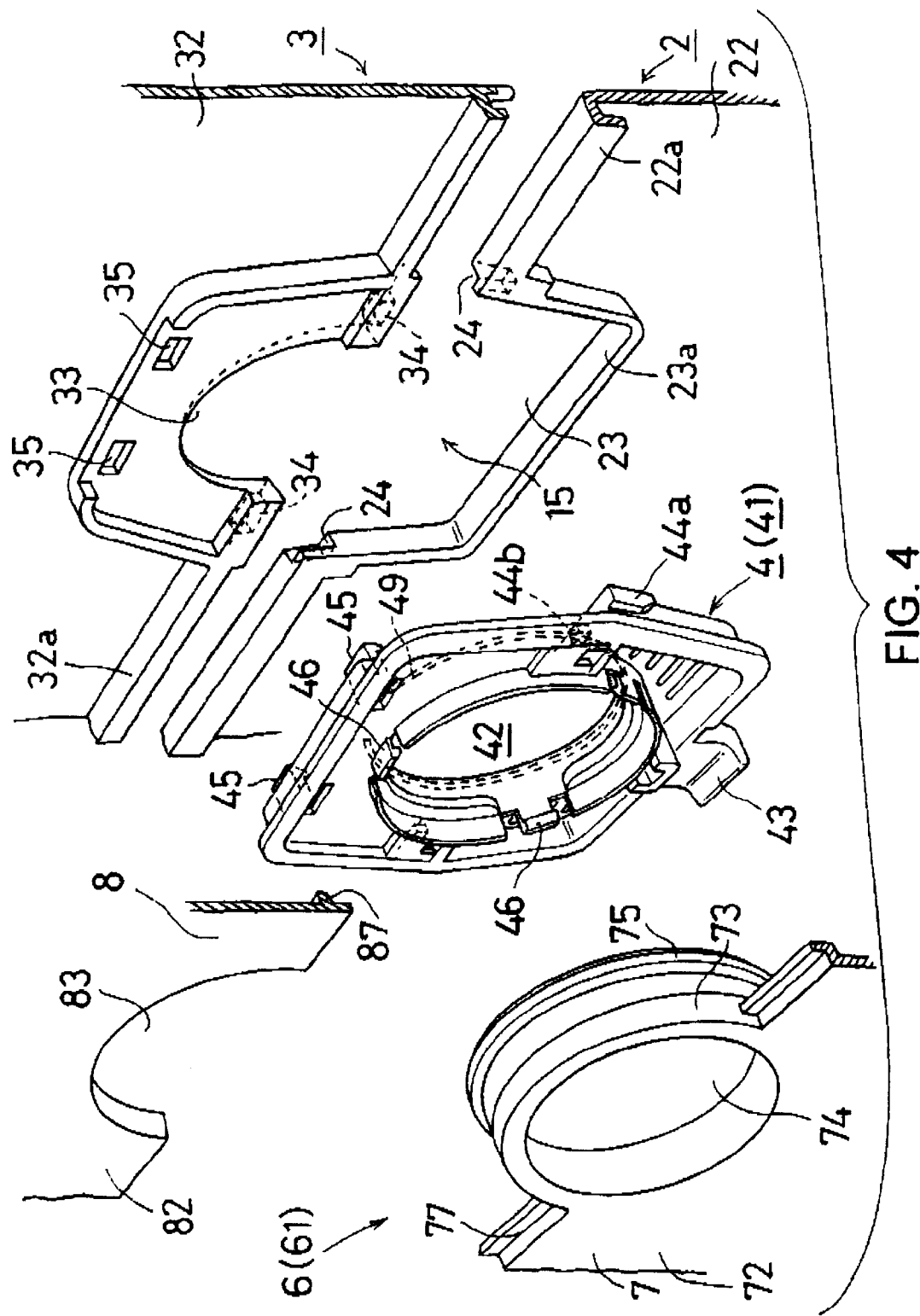
FIG. 4 is a perspective view showing a lip member and surrounding portion in a disassembled state.
Figure 5:
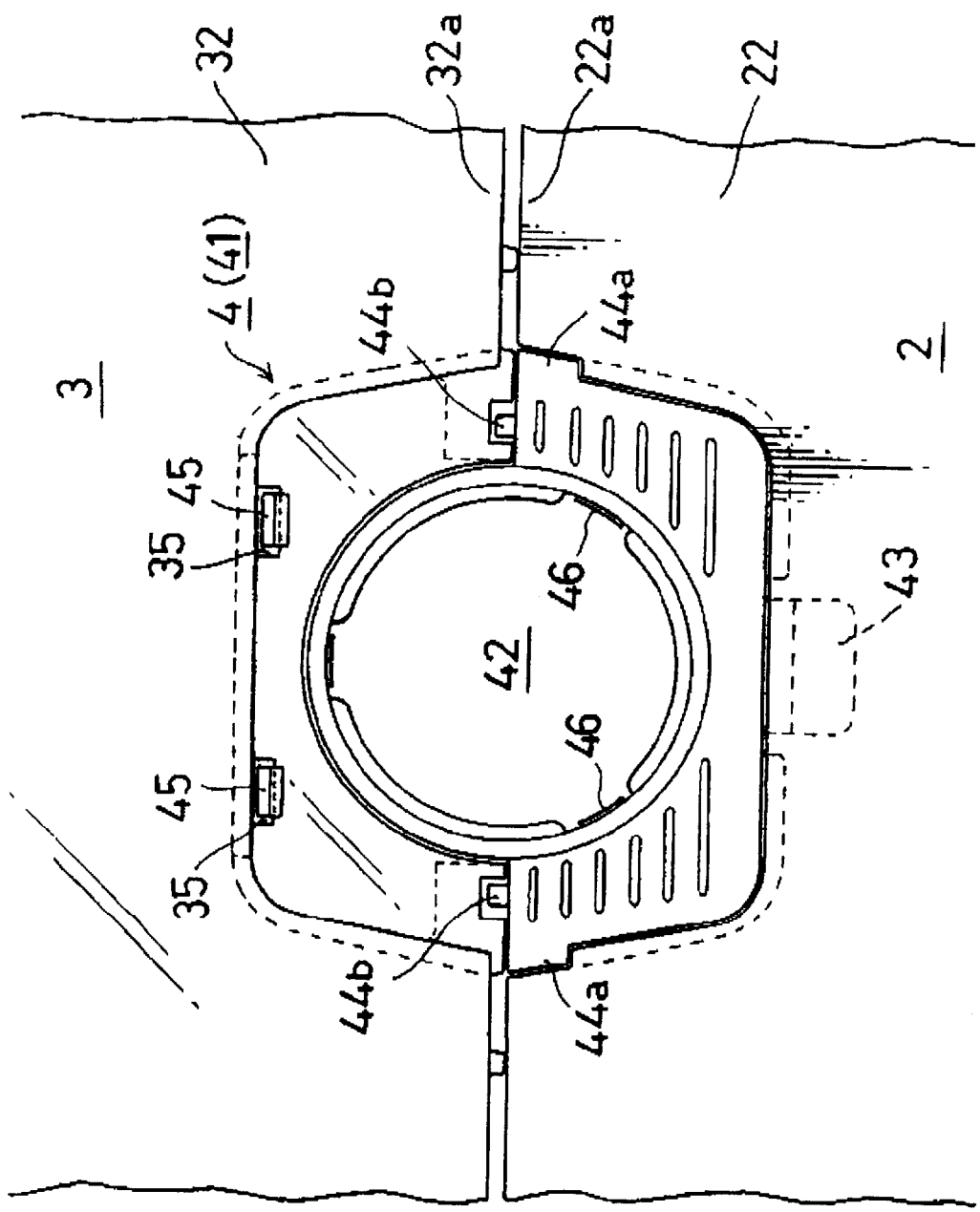
FIG. 5 is a rear view of the lip member employed in the housing system of the illustrated embodiment.
Figure 6:
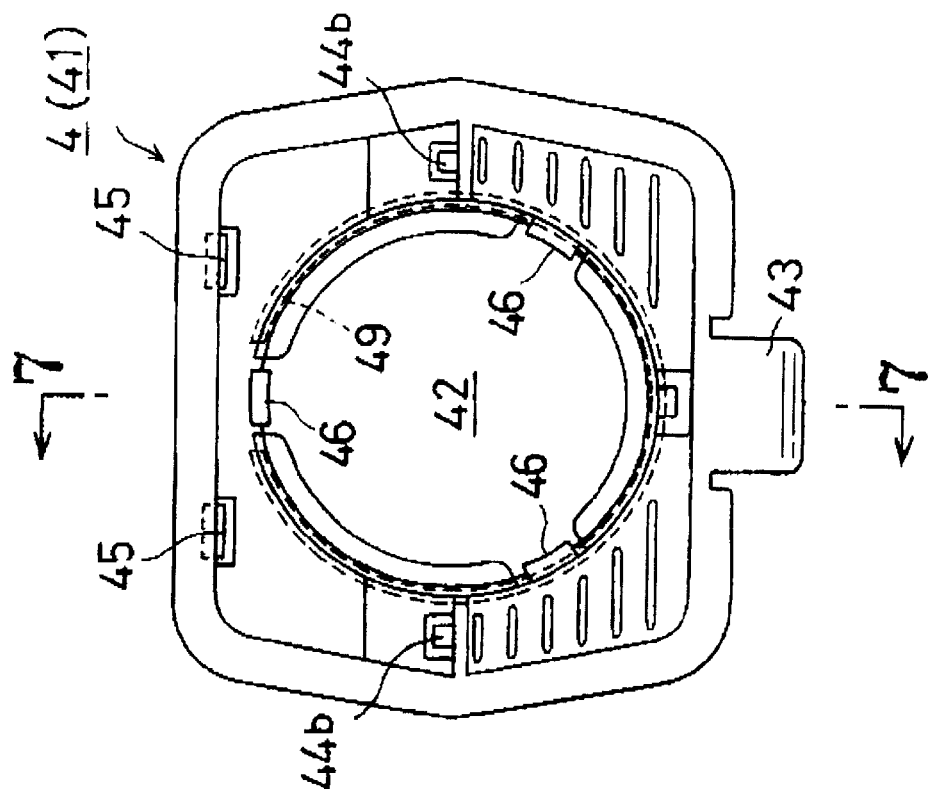
FIG. 6 is a front view of the lip member employed in the housing system of the illustrated embodiment.
Figure 7:
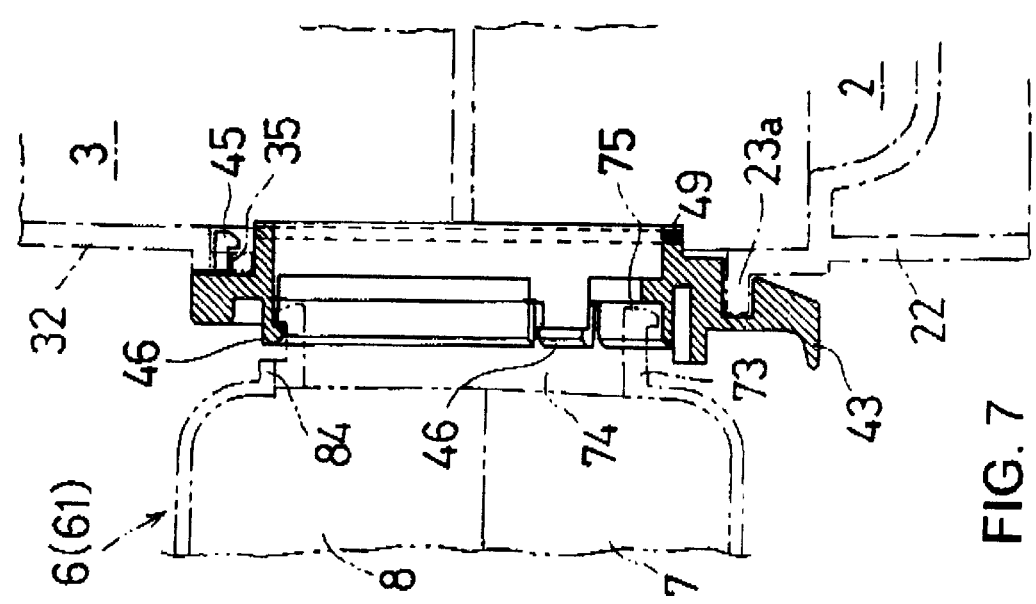
FIG. 7 is a cross-sectional view taken along the line 7—7 of FIG. 6.
Figure 8:
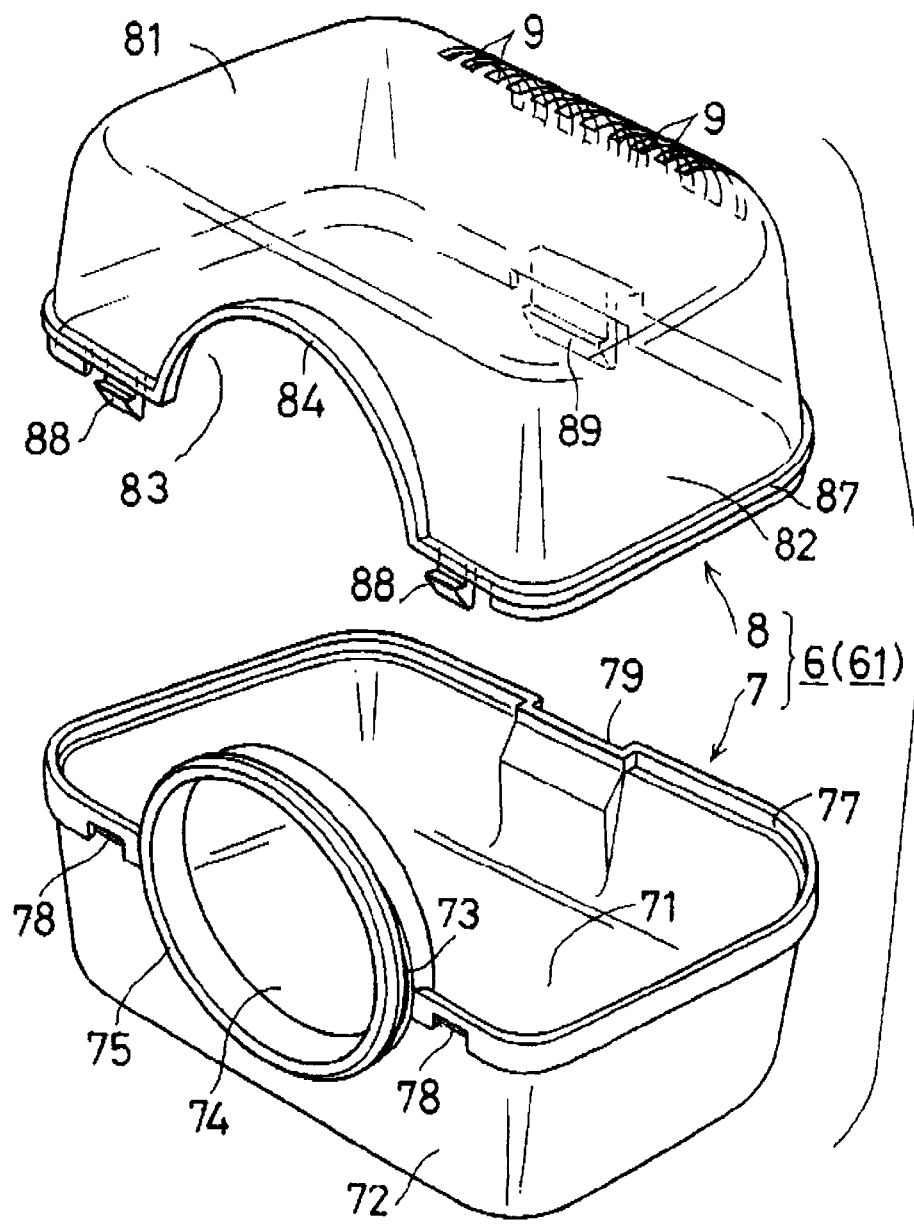
FIG. 8 is a perspective view showing the excretion housing employed in the illustrated embodiment in a disassembled state.
Figure 9:
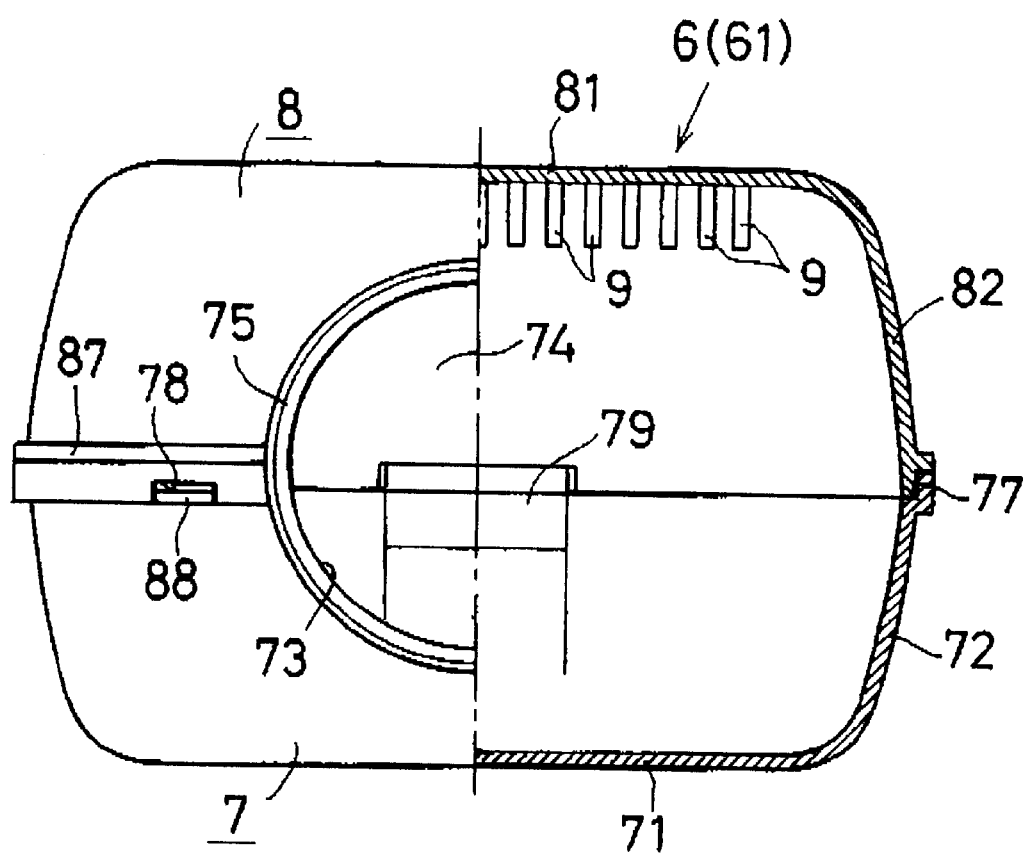
FIG. 9 is a partially cut-out front view of the excretion housing of the illustrated embodiment.
Figure 10:
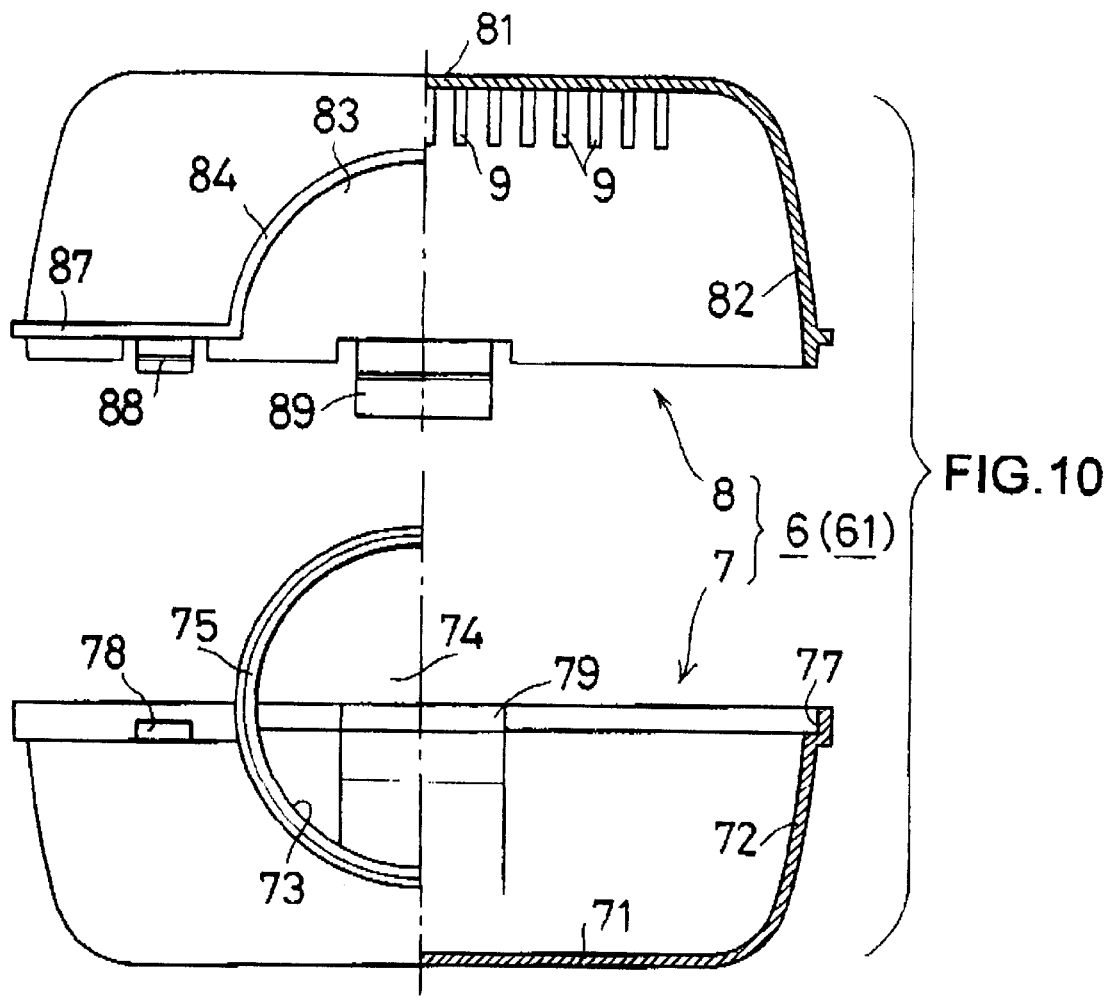
FIG. 10 is a partially cut-out front view of the excretion housing employed in the housing system of the illustrated embodiment.
Figure 11:
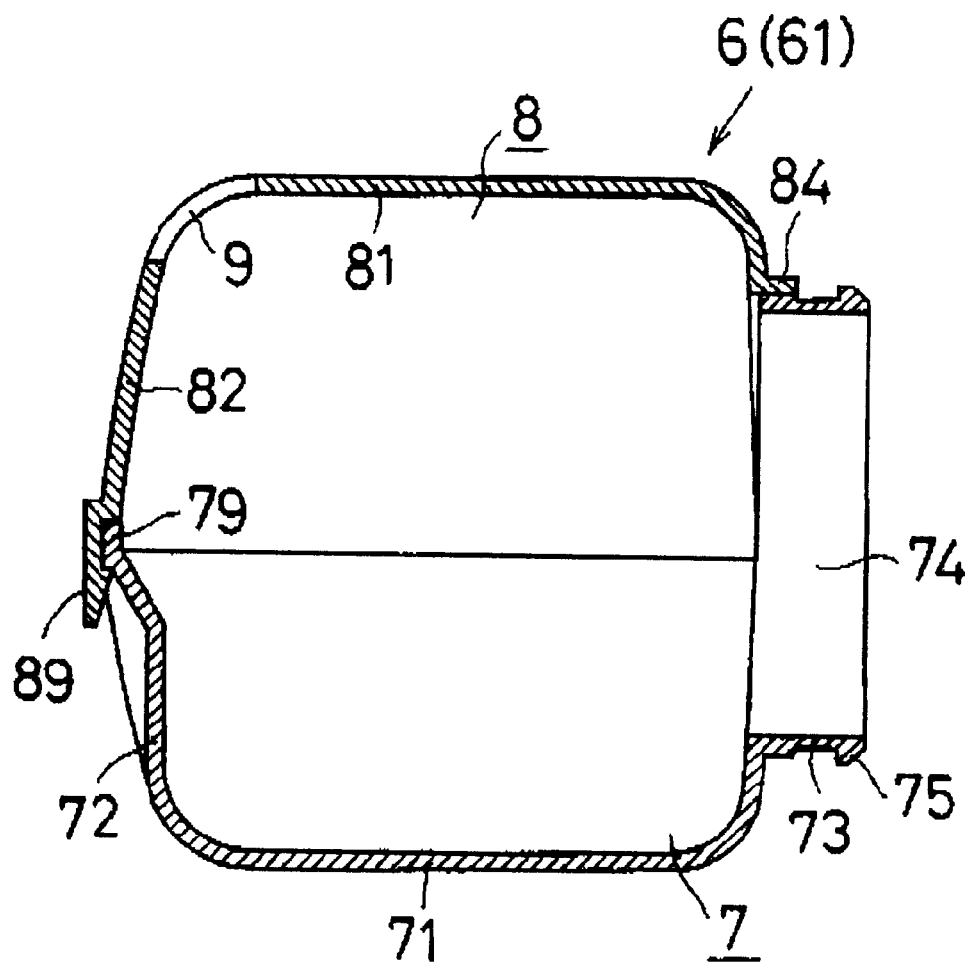
FIG. 11 is a side cross-sectional view of the excretion housing employed in the housing system of the illustrated embodiment.
Figure 12:
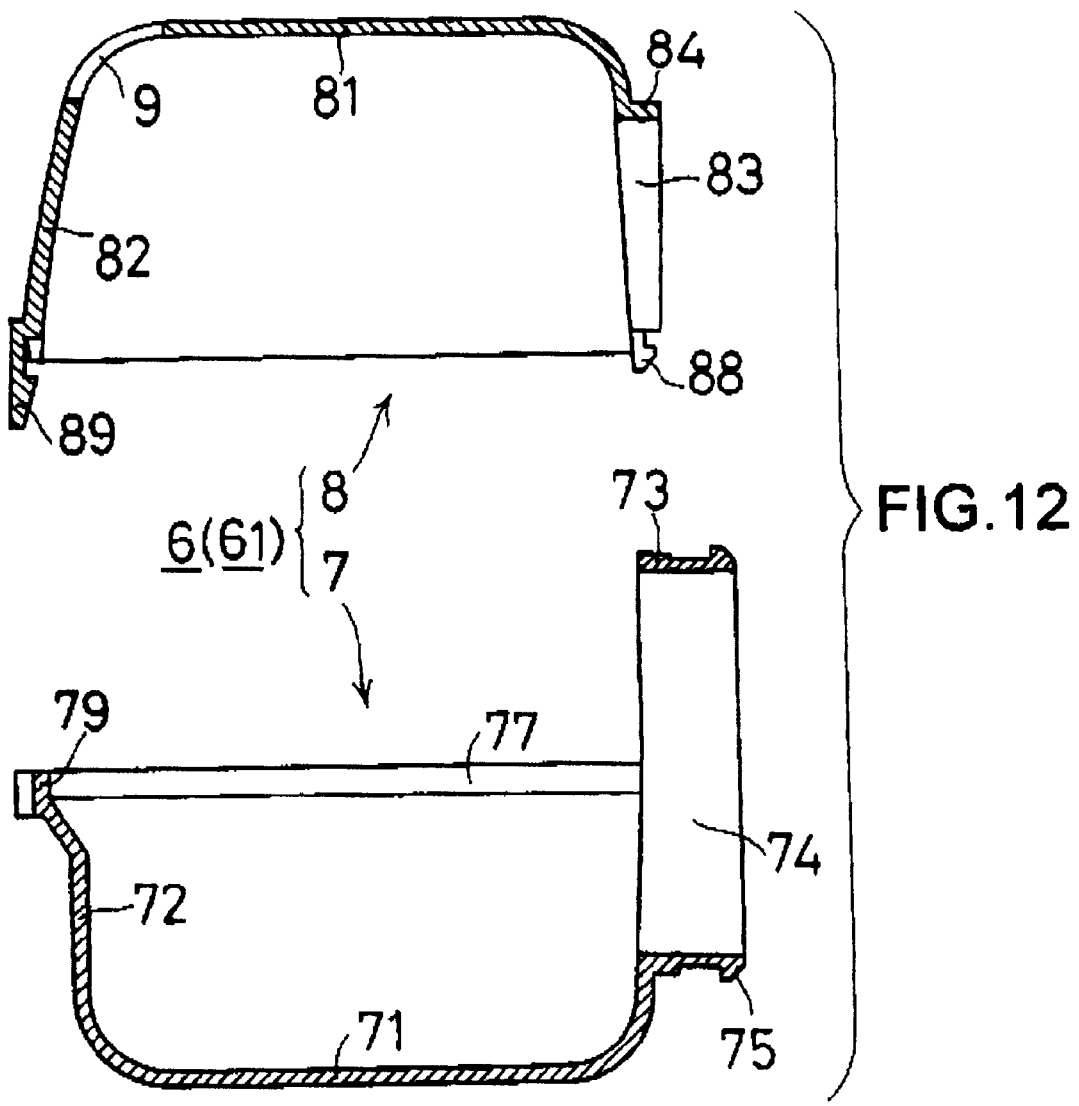
FIG. 12 is a side cross-sectional view showing the excretion housing employed in the housing system of the illustrated embodiment in a disassembled state.

As shown in FIG. 4, an upper end periphery 22a is defined by an upper end of the side wall 22 of the base tray 2. The upper end periphery 22a and a cut-out periphery 23a of the U-shaped cutout portion 23 protrude outwardly to form a flange. At the insides of corners between the upper end periphery 22a and the cutout periphery 23a, recesses 24 for positioning the lip member 4, which will be described below, are provided.

Figure 3:
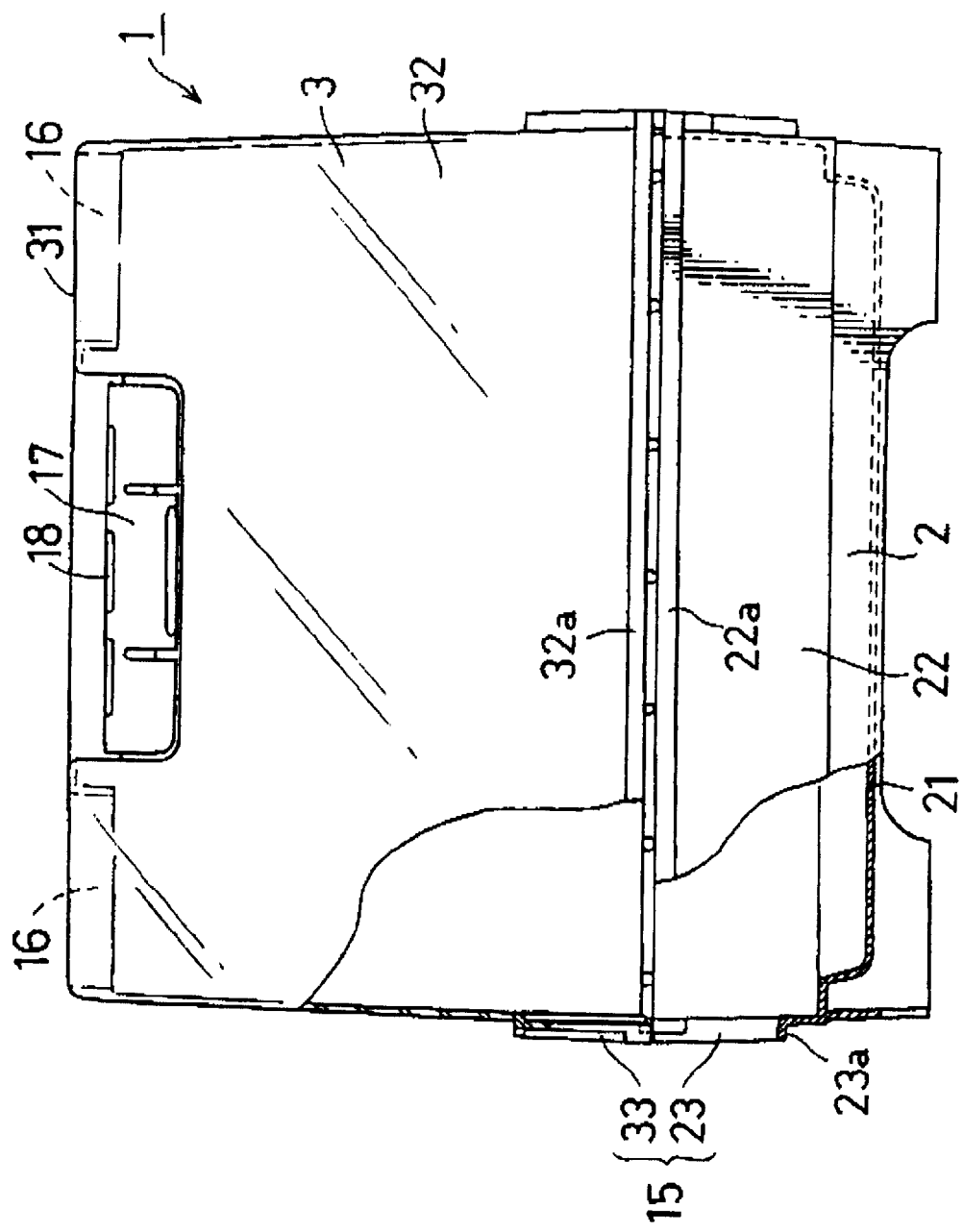
FIG. 3 is a partially cut-out front view of a main housing employed in the housing system.

As shown in FIGS. 1 to 3, the upper cover 3 is a transparent molded hard plastic article of a box-shape with its lower end opened. The upper cover 3 includes a top wall 31 and side walls 32 extending downward from a periphery of the top wall 31 and formed integrally therewith. A lower end periphery 32a is defined by a lower end of the side wall 32 of the upper cover 3. The lower end periphery 32a protrudes outwardly to form a flange. Further, the lower end periphery 32a is formed so as to fit the upper end periphery 22a of the base tray 2. Two opposing side walls 32 includes a reversed U-shaped cut-out portion 33, corresponding to the U-shaped cut-out portion 23 of the base tray 2, provided at a central lower portion of each of the two opposing side walls 32.

As shown in FIG. 4, at the inside ends of the lower end periphery 32a and in the proximity of the reversed U-shape cutout portion 33, recesses 34 for positioning the lip member 4, which will be described below, are provided. At right and left sides of the upper portion of the reversed U-shaped cut-out portion 33, engaging apertures 35 for engaging the lip member 4 are formed, respectively.

As shown in FIGS. 1 and 2, upper entrances 16, 16 that a hamster can pass through are formed at both the right and left sides of a rearward portion of the top wall 31 of the upper cover 3. Further, a lid 17 with a plurality of ventilating slits 19 is provided at a center portion of the top wall 31.

A breeding main housing 1 having a good appearance with a generally one-box shape, is achieved by placing the upper cover 3 on the base tray 2 so that the upper end periphery 22a and the lower end periphery 32a are fitted together. Side entrances 15, 15, through which hamsters can pass, are thus formed since the U-shaped cut-out portion 23 of the base tray 2 and the reversed U-shaped cut-out portion 33 of upper cover 3 are disposed across from each other.

As shown in FIGS. 1 and 2, the passageway tube 5 can be a transparent or semitransparent hard plastic article that has a flange 51 at an outer circumference of each end. One tube 5 can be connected with another tube 5 through a connecting ring 52 made of soft plastic so that a passageway with a desired length can be obtained.

In the illustrated embodiment, as shown in FIG. 1, a tube 5 is inserted into each of the upper entrances 16, 16 and connected to the upper cover 3 through a connecting ring 52 that is connected to the tube 5 with the outer surface of ring 52 tightly contacting the inner surface of the entrance 16. Alternatively, any of the entrances 16, 16 may be closed by a closing member (not shown).

As shown in FIGS. 4 to 7, the lip member 4, that is disposed at the cut-out portion 23 of the base tray 2 and the cut-out portion 33 of the upper cover 3, comprises a lip body 41 that has a passage 42 for hamsters at its center portion. The lip body 41 is a molded hard plastic article. Also, a metal ring 49 is mounted along a peripheral portion of the passage 42 of the lip body 41 by an insert forming method for preventing hamsters from gnawing through the plastic.

The lip member 4 has an inner side that faces the inside of the housing and an outer side that faces the outside of the housing. The lip member 4 has integrally formed upper hooks 45, 45 extending inwardly at both the right and left upper portions above the passage 42 at the inner side of the lip member 4. The lip member 4 has a lower hook 43 extending downwardly from its lower end and formed integrally therewith. Both right and left sides of the passage 42 have a protrusion 44a that is formed integrally with the lip member 4 at the inner side of the lip member 4 so that the protrusion 44a corresponds to the recess 24 of the base tray 2. Further, both right and left sides of the passage 42 have a protrusion 44b that is formed integrally with the lip member 4 at the inner side of the lip member 4 so that the protrusions 44b correspond to the recesses 34 of the upper cover 3.

An upper portion of the lip member 4 is attached to the reversed U-shaped cut-out portion 33 of the upper cover 3 in the following manner. The protrusion 44b of the lip member 4 is inserted into the recess 34 of the upper cover 3. Then the top engaging portion of the upper hook 45 of the lip member 4 is engaged with an inner surface of engaging aperture 35 of the upper cover 3. On the other hand, a lower portion of the lip member 4 is attached to the cut-out portion 23 of the base tray 2 in the following manner. The protrusion 44a of the lip member 4 is inserted into the recess 24 of the base tray 2 so that a top engaging portion of the lower hook 43 is engaged with the cut-out portion periphery 23a of the base tray 2.

As described above, the base tray 2 and upper cover 3 are fixed to each other through the lip members 4, 4.

On the outer side of the lip member 4, three flange hooks 46 are integrally provided at the peripheral portion or passage 42 at certain intervals in the circumferential direction thereof. On the outer side of the lip member 4, the passageway tube 5 may be connected. The connection of the passageway tube 5 to the lip member 4 can be carried out as follows. The flange 51 of the passageway tube 5 is inserted into the passage 42 of the lip member 4 while the center of the tube 5 aligns with that of the lip member 4. Then, the tube 5 is pushed toward the lip member 4 so that the tube 5 is connected to the lip member 4 by an elastic engagement between the flange hooks 46 and the flange 51 of tube 5. When the connected tube 5 is pulled outward from the lip member 4, the engagement of the flange 51 of the tube 5 by the flange hooks 46 is released and the tube 5 will come off from the lip member 4. Thus, the tube 5 can be detached from the lip member 4.

In the illustrated embodiment, instead of connecting the tube 5 with the lip member 4, the passage 42 can be detachably closed by a closing member (not shown), or an excretion housing 6 can be attached to the lip member 4 as will be described later.

As shown in FIGS. 8 to 12, the excretion housing 6 has an excretion housing body 61 including a lower housing 7 of a hard molded plastic article and an upper housing 8 of a transparent molded plastic article.

The lower housing 7 is a top-opened box having a bottom wall 71 and a peripheral wall 72 extending upwardly from a periphery of the bottom wall 71 and formed integrally therewith.

On the central front portion of the peripheral wall 72, a cylindrical entrance member 73 is integrally formed such that the entrance member 73 slightly protrudes forward from the peripheral wall 72. The lower half of the entrance member 73 is disposed below the upper end of the peripheral wall 72, and the upper half of the entrance member 73 is disposed beyond the upper end of the peripheral wall 72, so that the central opening of the entrance member 73 constitutes an entrance for hamsters.

The upper end peripheral portion of the peripheral wall 72 has an outwardly extended fitting-shoulder portion 77.

A pair of engaging holes 79, 78 are provided in both end portions of the fitting-shoulder 77 adjacent to the cylindrical entrance member 73. A portion of the fitting-shoulder 77 located at the rear center of the peripheral wall 72 of the lower housing 7 is inwardly dented to form an engaging concave portion 79.

The upper housing 8 is a bottom-opened box having a top wall 81 and a peripheral wall 82 extending downwardly from a periphery of the top wall 81 and formed integrally therewith.

On the front central portion of the peripheral wall 82, a semicircular shaped cut-out portion 83 for fitting an upper half portion of the cylindrical entrance member 73 is formed. A forwardly protruded flange 84 is integrally formed along the periphery of the cut-out portion 93. At the vicinity of the lower end of the peripheral wall 82, an outwardly protruded flange 87 is integrally formed along approximately the whole circumference of the peripheral wall 82.

On the front lower end of the peripheral wall 82 of the upper housing 8, a pair of downwardly protruded front hooks 88, 88 are integrally formed at both sides of the cut-out portion 83 so as to engage with the engaging holes 78, 78. On the rear lower end of the peripheral wall 82 of the upper housing 8, a downwardly protruding rear hook 89 is integrally formed so as to engage with the engaging concave portion 79.

At the rounded corner portion connecting the top wall 81 and the rear side of the peripheral wall 82, a number of vertically extended ventilating slits 9 are provided at certain intervals.

By covering the upper housing 8 on the lower housing 7, the upper housing 8 is connected to the lower housing 7 by elastic engagements between the lower end engaging portions of the front hooks 88, 88 of the upper housing 8 and the corresponding engaging holes 78, 78 of the lower housing 7 and by the elastic engagement between the lower end engaging portion of the rear hook 89 of the upper housing 8 and the engaging concave portion 79 of the lower housing 7. In this state, the upper half of the cylindrical entrance member 73 of the lower housing 7 is fitted in the cut-out portion 83 of the upper housing 8, and the outwardly protruded flange 87 of the upper housing 8 abuts the upper end of the peripheral wall 72 of the lower housing 7 with the lower end of the peripheral wall 82 fitted in the fitting-shoulder of the lower housing 77. Thus, an excretion housing 6 having a good appearance is formed.

As shown in FIG. 1, this excretion housing 6 is connected to the main housing 1 so that the excretion housing 6 is disposed at the outside of the main housing 1.

The connection of the excretion housing 6 to the main housing 1 is carried out as follows. The cylindrical entrance member 73 of the excretion housing 6 is pushed into the passage 42 of the lip member 4 to resiliently engage the flange 75 of the entrance member 73 with the flange hook 46 of the lip member 4. Thus, the excretion housing 6 is connected to and supported by the main housing 1 with the entrance 74 aligned with the passage 42 of the lip member 4 as well as the side entrance 15.

The excretion housing 6 can be detached from the main housing 1 by pulling the excretion housing 6 out of the lip member 4 to disengage the flange 75 of the excretion housing 6 from the flange hook 46 of the lip member 4.

As mentioned above, according to the illustrated embodiment, since the excretion housing 6 is detachably connected to the outside of the main housing 1, an exchange of filler or a disposal of excretion can easily be conducted by only detaching the excretion housing 6 from the main housing 1. In this case, since it is not required to detach the upper cover 3 from the base tray 2 or to open the lid 17 of the main housing 1, it is possible to surely prevent hamsters from escaping through the opened space.

Since the excretion housing 6 is made up of the lower housing 7 and the upper housing 8, the excretion housing 6 can be easily opened by detaching the upper housing 8 from the lower housing 7 after the excretion housing 6 is detached from the main housing 1, resulting in an easier exchange of filler materials and the like.

In addition, in the illustrated embodiment, since the flange 75 for connecting the excretion housing 6 to the main housing 1 is formed on the lower housing 7, the upper housing 8 can be detached from the lower housing 7 with the lower housing 7 connected to the main housing 1. Thus, an exchanging filler contained in the excretion housing 6 or disposing of excretion can be easily conducted.

Since the excretion housing 6 has a substantially closed structure, filler or excretion in the excretion housing 6 can be prevented from being scattered outside even if the hamsters dig up or scatter them. Thus, environmental pollution around the excretion housing 6 can be surely prevented.

The excretion housing 6 has a plurality of ventilating slits 9. Thus, a sufficient ventilation in the excretion housing 6 can be obtained, which effectively prevents hamsters from becoming ill or weakened due to unexpected changes in the humidity or temperature.

In the illustrated embodiment, since the cylindrical entrance member 73 and the flange 75 are integrally formed on the lower housing 7, the excretion housing 6 can be more easily manufactured as compared with the case wherein they are attached to the lower housing 7 as a different member.

In the illustrated embodiment, the housing system components such as the main housing 1, the lip member 4, the passageway tube 5 and the excretion housing 6 are made of hard synthetic resin, respectively. Thus, these components can be manufactured by a heat forming method, for example, with high manufacturing efficiency and their material costs can be kept low, which results in a reduced manufacturing cost.

Since a metal ring 49 is inserted at the peripheral portion of the passage 42 of the lip member 4 that is to be connected to the main housing 1, the peripheral portion of the passage 42 is effectively prevented from being gnawed at too much by hamsters. Therefore, hamsters are prevented from escaping due to breakage resulting from gnawing.

Since the metal ring 49 is fitted by an insert forming method (e.g., so formed as an insert within the peripheral portion of the passage 42) so as to be hidden within the lip member 4, the ring 49 can be fixed to the lip member 4 more easily and firmly than in a case where, for example, the ring is merely attached afterward or the like. Further, since the ring is hidden, a good appearance can be achieved.

Since the lip member 4 is manufactured separately from the housing 1, the structure of the mold for the main housing 1 becomes less complicated than the case where a lip member structure is integrally formed with the housing 1, and therefore further reduction of cost can be attained.

In the illustrated embodiment, the lip member 4 is a member for connecting the excretion housing 6. However, since the lip member 4 can also be used as a member for connecting the tube 5 as well as a member for connecting the base tray 2 to the upper cover 3, the number of components can be reduced to lower the production cost.

Figure 13:
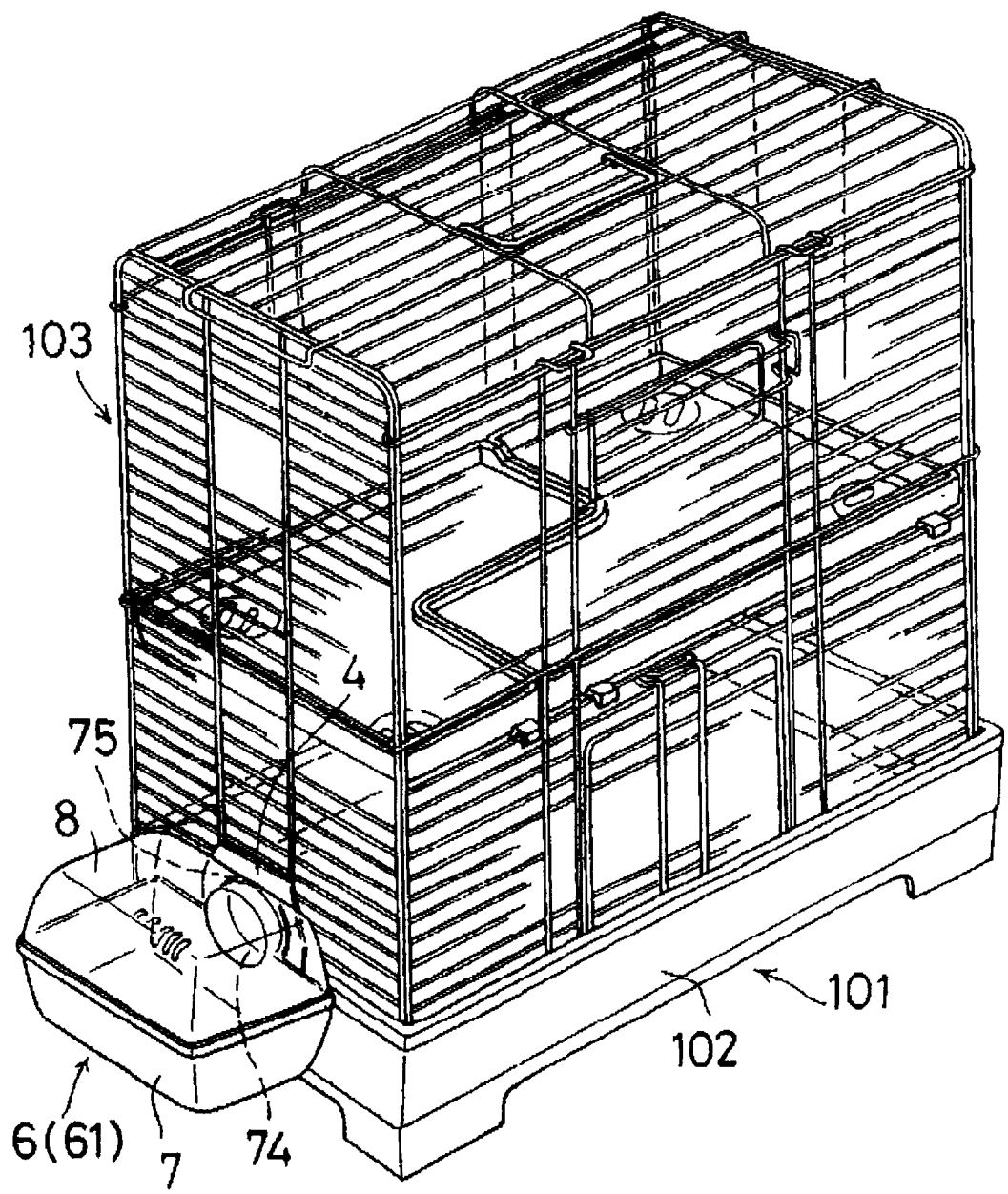
FIG. 13 is a perspective view showing a modified embodiment of the housing system including an excretion housing according to the present invention.

FIG. 13 shows a modified embodiment of a breeding housing system for hamsters according to the present invention. In the breeding system, the main housing 101 includes a base tray 102 made of a hard synthetic resin and a cage-type upper cover 103 made of a plurality of wires crossed with each other transversely and longitudinally. At the entrance formed on the side wall of the main housing 101, the lip member 4 mentioned above is detachably connected. Detachably connected to the lip member 4 is the excretion housing 6 described above.

In the modified embodiment, the excretion housing 6 may also be directly connected to the main housing 101 without using the lip member 4 or the like. Further, the excretion housing 6 may be connected to the main housing 101 by way of an accessory member such as a passageway tube.

In the present invention, it is not necessary that the excretion housing be supported by the main housing. The excretion housing may be disposed for example on an appropriate support in the case where the excretion housing is connected to the main housing by way of a passageway tube or passageway tubes at mentioned above.

In the above-mentioned embodiments, although the excretion housing is formed with a rectangular shape, the shape of the excretion housing is not especially limited to the above and may be of any shape.

Further, in the above-mentioned embodiments, although the excretion housing is composed of two components, that is the upper housing and the lower housing, the excretion housing may be composed of three or more components.

As described above, according to the excretion housing for small animals such as hamsters, since the excretion housing is disposed outside the main housing, exchanging filler or disposing excretion can be done without taking out the excretion housing from the main housing. Further, in this case, since it is not required to detach an upper cover of the main housing or to open a door when exchanging filler materials or disposing of excretion, hamsters are prevented from escaping.

Since the excretion housing has a substantially closed structure, filler or excretion in the excretion housing can be prevented from being scattered outside even if the hamsters dig up or scatter them. Thus, environmental pollution around the excretion housing can be surely prevented.

In such a case that the excretion housing body is composed of an upper half housing body and a lower half housing body, and the upper half housing body is detachably connected to the lower half housing body, the excretion housing body can be easily opened by detaching the upper housing body from the lower housing body after the excretion housing body is detached from the main housing, resulting in an easier exchange of filler materials or disposing of excretion.

When the excretion housing body is made of hard synthetic resin, it can be manufactured by a heat forming method, for example, with high manufacturing efficiency, and the material cost can be kept low, which results in a reduced manufacturing cost.

In such a case that the excretion housing body has a plurality of ventilating slits, the ventilation in the excretion housing can be enhanced.

When the outwardly protruding cylindrical portion is formed on the lower housing, the upper housing body can be detached from the lower housing body with the lower housing body connected to the main housing. Thus, exchanging filler materials contained in the excretion housing or disposing of excretion therein can be easily done.

Although preferred embodiments according to the present invention are described, it should be recognized that various modifications are possible within the scope of the present invention.

This application claims priority to Japanese Patent Application No. Hei 9(1997)-235535, the disclosure of which is incorporated by reference in its entirety.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. An excretion housing for small pet animals, comprising:

an excretion housing body to be directly or indirectly connected to a main housing for breeding small pet animals such that said excretion housing body is disposed outside the main housing, said excretion housing body having an entrance opening for small pet animals at a side wall of said excretion housing body; and a tubular connecting member for directly or indirectly connecting said excretion housing body to the main housing, wherein said excretion housing body is divided into an upper housing body having an upper portion of said entrance opening and a lower housing body having a lower portion of said entrance opening, said upper housing body being detachably connected to said lower housing body to form a substantially closed space therein for small pet animals, wherein said connecting member is integrally provided to said lower housing body along a periphery of said lower portion of said entrance opening such that an upper portion of said connecting member is upwardly protruded from an upper periphery of said lower housing body so as to fit on a periphery of said upper portion of said entrance opening.

2. The excretion housing for small pet animals as recited in claim 1, wherein said excretion housing body is made of hard synthetic resin.

3. The excretion housing for small pet animals as recited in claim 1, wherein said excretion housing body has a plurality of ventilating slits.

4. The excretion housing for small pet animals as recited in claim 1, wherein said connecting member is a short cylindrical member.

5. The excretion housing for small pet animals as recited in claim 1, further comprising a lip member for connecting said excretion housing body to the main housing or a passageway tube connected to the main housing, said lip member having an entrance opening for small pet animals and being detachably connected to said cylindrical connecting member.

6. A housing system for small pet animals, comprising:

a main housing for breeding small pet animals therein, said main housing having a side wall with an opening; and an excretion housing, wherein said excretion housing includes:

an excretion housing body forming a substantially closed space for small pet animals therein, said excretion housing body having an entrance opening for small pet animals at a side wall of said excretion housing body; and a tubular connecting member for directly or indirectly connecting said excretion housing body to said main housing by said connecting member, wherein said excretion housing body is directly or indirectly connected to said main housing such that said excretion housing body is disposed outside said main housing, wherein said excretion housing body is divided into an upper housing body having an upper portion of said entrance opening and a lower housing body having a lower portion of said entrance opening, said upper housing body being detachably connected to said lower housing body, and wherein said connecting member is integrally provided to said lower housing body along a periphery of said lower portion of said entrance opening such that an upper portion of said connecting member is upwardly protruded from an upper periphery of said lower housing body so as to fit on a periphery of said upper portion of said entrance opening.

7. The housing system for small pet animals as recited in claim 6, wherein said excretion housing body is made of a hard synthetic resin.

8. The housing system for small pet animals as recited in claim 6, wherein said excretion housing body has a plurality of ventilating slits.

9. The housing system for small pet animals as recited in claim 6, wherein said connecting member is a short cylindrical member.

10. The housing system for small pet animals as recited in claim 6, further comprising a lip member for connecting said excretion housing body to said main housing, said lip member having a passage and being detachably connected to said main housing with said passage aligned with said opening.

* * * * *